united States Patent Office 3,244,188
Patented Apr. 5, 1966

3,244,188
INHIBITION OF DEPOSITION OF HYDRO-
CARBONACEOUS SOLIDS FROM OIL
Christ F. Parks, Tulsa, Okla., and Fred W. Burtch, Monroeville, Pa., assignors to The Dow Chemical Company, Midland, Mich., a corporation of Delaware
No Drawing. Filed Oct. 3, 1962, Ser. No. 228,015
9 Claims. (Cl. 137—15)

The invention is concerned with lessening the adhesion of hydrocarbonaceous deposits from oil, e.g., crude petroleum and its derivatives, deposited on the surface of equipment which is contacted by the oil.

The adhesion and accumulation of hydrocarbonaceous solids on the walls of oil-producing and oil-handling equipment has long been recognized as a major problem in the production, transfer, storage, and processing of petroleum and petroleum products. Although the invention is concerned with any equipment contacted by oil, and, therefore, includes any surface affected thereby, e.g., the walls of metal tubing, pipe lines, pumping assemblies, valves, gauges, and storage tanks, for simplicity of expression such equipment hereinafter will be usually referred to as vessels.

Oil, as it first comes into contact with a restraining wall, e.g., the interior of a confining vessel, often contains certain hydrocarbonaceous substances which are in solution or otherwise flowable at the time of such first contact but, subsequent thereto and prior to termination of the contact therewith, are converted to non-flowable substances. Such substances are often deposited on the walls and form a tenacious bond therewith and thereafter must be removed therefrom at considerable cost, inconvenience, and lost time from production.

Although the character of the adhering deposit thus formed on the interior of the vessels varies somewhat, it consists largely of solidified hydrocarbons which have undergone a change of state from liquid to solid during a drop in temperature or rate of flow, or other altered condition which occurs during the contact with the walls of the vessel together with lesser amounts of substituted hydrocarbons, occluded oil, entrained water, sand, silt, and traces of other inorganic substances. The hydrocarbons are chiefly aliphatic (both straight and branched chain), aromatic, naphthenic, asphaltic, and small amounts of various resins. Because paraffin composes the largest percent of such hydrocarbonaceous depositions, they are often referred to broadly as paraffin wax, paraffin, or "rod wax." Paraffin wax is considered to have a melting point of between about 110° and 160° F. However, the paraffin waxes usually have intermixed therewith sufficient other waxes and resins which have higher molecular weight, longer length carbon atom chains per molecule, and higher average melting points (say, of from about 150° to 200° F.) that the depositions have imparted thereto a particularly adhesive property. Such other waxes, often referred to broadly as resins, usually contain some complex molecular structures including oxygen, nitrogen, and sulfur combined therewith. The presence of such complex structures often render them particularly resistant to removal from the walls of the vessels to which they adhere.

Although a change in temperature is considered a fundamental cause for the deposition of hydrocarbonaceous solids, other factors are thought to contribute to such deposition, among which are: alternate coating and draining of oil from a surface, change in flow rate, change in agitation, presence of sand, silt, and water, roughness or smoothness of the confining surface, expansion of the more volatile constituents of the oils, liberation of such volatile constituents from the oil, change in viscosity of the oil, and conditions (not too fully understood) that appear to encourage growth of the paraffin and other solid hydrocarbonaceous substances, present in the oil, on the surfaces with which the oil comes in contact. Hydrocarbonaceous deposits may be removed from surfaces by scraping with especially designed instruments, the procedure sometimes being referred to as "knifing." They may also be removed by passing hot oils, e.g., at a temperature of between 300° and 400° F., through the vessels from which the deposit is sought to be removed. Aside from the scraping being a particularly time-consuming and tedious task and the hot oil flush representing considerable cost in heating, pumping, and the like, neither method offers any prevention to the accumulation and continued formation of such deposits after such cleaning operation. The inconvenience and cost of such hydrocarbonaceous solid removal must be repeated at frequent intervals which makes their formation an especially serious problem.

Attempts have been made to render the walls of vessels contacted by oil less susceptible to the deposition and adherence of paraffinic substances contained in the oil. One attempt comprises the steps of treating the walls with a mineral acid, thereafter forming on the acid-treated walls a water-insoluble salt comprising iron gallate, and then coating the thus treated walls with a gelatinous silica layer. This method has apparent disadvantages inherent in carrying it out and is not so effective as is desired. Dissolution by such organic substances as $CS_2$ has also been employed with moderate but not fully satisfactory success.

There is a desideratum, therefore, in the production, transportation, storage, and processing of oil, for a satisfactory process for inhibiting the formation of adhering hydrocarbonaceous solids on the walls of vessels contacted by oil.

The present invention is a method of inhibiting the adhesion of solid hydrocarbonaceous substances deposited from oil on adhesion-susceptible surfaces in contact with the oil, which consists of flushing the surfaces with an alkaline agent to render the surfaces water wettable and contacting the thus treated surfaces with a small but effective amount of an aqueous solution of a polymer selected from the group consisting of homopolymers of N-vinyl-alkyl-2-oxazolidinones and alkali salts of such homopolymers; copolymers of N-vinyl-alkyl-2-oxazolidinone and a monomer selected from the class consisting of maleic anhydride, sodium styrene sulfonate, sodium vinyl toluene sulfonate, and an alkyl acrylic acid, i.e., $CH_2=CRCOOH$ wherein R is alkyl; alkali salts of copolymers of N-vinyl-2-oxazolidinone and maleic anhydride; copolymers of N-vinyl-alkyl-2-oxazolidinone and maleic anhydride and alkali salts thereof; copolymers of vinyl morpholinone and maleic anhydride; copolymers of vinyl pyrrolidone and a monomer selected from the class consisting of maleic anhydride and vinyl acetate; copolymers of ethylene and maleic acid; and alkali amide salts of copolymers of ethylene and maleic anhydride. Alkyl substituents are either methyl or ethyl groups. In the practice of the invention, alkali salts of maleic anhydride may be used wherever maleic anhydride is the suggested monomer. The term alkali salts includes salts of the alkali metals and ammonium. The polymer employed has a relatively high molecular weight, of at least about 10,000, and desirably of at least 100,000 and preferably of at least 500,000. The degree of polymerization of a polymer used in the practice of the invention is conveniently expressed as the K number, as described for instance in Fikentscher, Cellulosechemie, vol. 13, page 58 (1932). In the preferred practice of the invention, the polymer solution is made alkaline by admixing therewith an agent which yields OH ions in aqueous media. A K number of between about 24 and 40 is recommended.

The method of the invention is carried out by:

(1) Rendering a substantially hydrocarbonaceous deposition-free surface of a vessel, e.g., pipe, conduit, tank, or the like, water-wet by contacting the surface with an aqueous alkaline solution, e.g., 1 to 10 percent aqueous solution of NaOH, $Na_3PO_4$, or $Na_2CO_3$;

(2) Treating the water-wet surface with an aqueous solution of one or more of the above polymers as by pumping such solution into or through the vessel wherein the deposition of hydrocarbonaceus substance from oil in contact therewith is to be inhibited. A temperature of between about 0° C. and about 100° C. may be employed. The prevailing temperature at the location of the treatment, for instance at a well wherein the tubing is to be treated, is usually quite satisfactory.

Water is usually employed for dissolution of the polymer, although typical brines of the nature commonly employed in treatment of wells may be used. The pH value of the aqueous polymer solution is preferably alkaline, usually being between about 8.0 and 11.0. The desired pH is most conveniently attained by admixing the required amount of a 5 to 50 weight percent aqueous solution of NaOH therewith.

The amount of the polymer to employ in preparing the aqueous treating solution varies, being dependent upon a number of factors, among which are: the particular polymer employed, the character of the hydrocarbonaceous material which deposits out of the oil, the character of the surface to be treated, and the design of the vessel. An effective amount of the polymer to employ to attain the objectives of the invention is usually between about 5 and 1000 parts thereof per million of water or brine, between 25 and 100 parts thereof per million of water or brine being recommended. The use of an amount of less than 25 parts per million shows a rather marked decline in effectiveness, and an amount greater than 100 parts per million is not generally reflected by measurably improved results.

The invention provides a method of keeping the inner surface of vessels, in general, illustrative of which are piping systems, well tubing, oil storage tanks, transfer lines, and conduits, substantially free from adhering hydrocarbonaceous deposits, of which paraffin and other waxes and resins including silt and the like entrapped therein are illustrative, for long periods of time. In practicing the invention wherein such surfaces to be treated have been in contact with oil containing hydrocarbonaceous materials which tend to deposit on surfaces in contact therewith, prior to the treatment therewith, the hydrocarbonaceous materials already deposited on the surfaces must be removed before being treated in accordance with the invention. Recommended ways of removing such depositions already present include:

(1) Pumping hot oil into the tubing or into the pipe or other vessel as the case may be, allowing it to remain in contact therewith for a period sufficient to dissolve the deposit, but insufficient to result in cooling and solidification, and thereafter removing the thus used hot oil, usually by pumping from the vessel being treated;

(2) Contacting the deposition-coated surfaces with steam;

(3) Mechanically scraping the depositions from the surface by especially adapted knives; or (4) Combinations of the above ways—usually in sequence.

The treatment in accordance with the invention is conveniently carried out by employing conventional pumping equipment. The aqueous polymer solution employed is usually prepared prior to use and thereafter pumped into and/or through the vessel being treated. However, if desired, the polymer in a dry state or in a concentrated aqueous solution may be fed into water or brine as it is being pumped into the vessel or tubing from which deposition of the hydrocarbonaceous substances is to be inhibited, and is thereby effectively admixed therewith by the turbulence accompanying the pumping action. The polymer solution must be maintained in contact with the surface being treated for a time sufficient to wet the surface, a time of at least about 10 minutes and preferably for at least about 4 hours.

The preferred mode of practicing the invention includes a follow-up treatment which comprises contacting the surface to be treated with an aqueous polymer solution, as above described, and thereafter periodically admixing with the oil, coming into contact with the thus treated surface a relatively small amount of an aqueous polymer solution which may be the same one employed in the treatment or another selected from those set out above. The amount of polymer employed in the follow-up treatment is dependent to a large extent upon the nature and extent of the hydrocarbonaceous material in the oil. Satisfactory results are attained by adding between 0.5 and 5 gallons of a 20 to 100 parts per million solution of the aqueous polymer per 100 barrels of the oil which contact the surface from which such deposition is to be inhibited.

The frequency of the addition of the aqueous polymer solution depends upon the quantity of oil moving through the conduit or tubing, it being the recommended procedure to maintain the ratio as nearly possible at between 1 and 2 gallons of the aqueous solution per 100 barrels oil. In the treatment of tubing in a producing well, 0.2 to 2 gallons of the aqueous polymer solution are usually fed into the tubing near the bottom every 12 to 72 hours, e.g., each day.

Illustrative of the polymers useful in the practice of the invention are those represented by the following formulae, wherein both R and R' may be methyl or ethyl or wherein either R or R' (but not both) may be H, and wherein $n$ is an integer representing a repeating unit to give a molecular weight of at least about 10,000:

(1) A homopolymer of methyl- or ethyl-substituted N-vinyl-2-oxazolidinone:

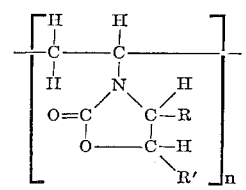

(2) An alkali metal or ammonium salt of the polymer of (1);

(3) A copolymer of a methyl- or an ethyl-substituted N-vinyl-2-oxazolidinone and maleic anhydride:

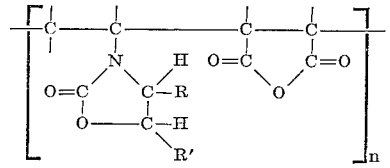

(4) A polymer of a methyl- or an ethyl-substituted N-vinyl-2-oxazolidinone and sodium styrene sulfonate:

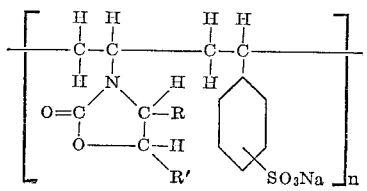

(5) A copolymer of a methyl- or an ethyl-substituted N-vinyl-2-oxazolidinone and sodium vinyl toluene sulfonate:

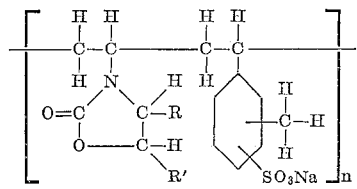

(6) A copolymer of N-vinyl-2-oxazolidinone and maleic anhydride:

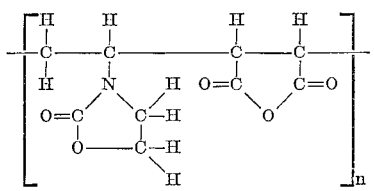

(7) A copolymer of N-vinyl morpholinone and maleic anhydride:

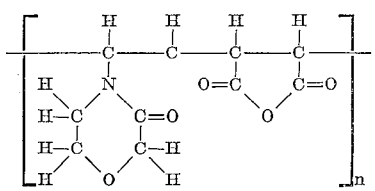

(8) A copolymer of N-vinyl pyrrolidone and vinyl acetate:

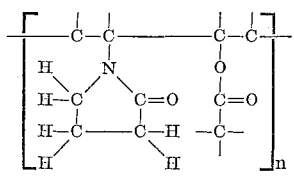

(9) A copolymer of ethylene and the amide ammonium salt of maleic anhydride:

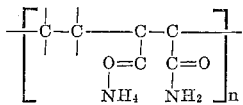

(10) A copolymer of ethylene and maleic acid:

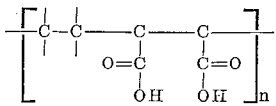

Methods of preparing the monomer for use in subsequent polymerization and methods of carrying out polymerization for the preparation of the polymers for use in the practice of the invention are known. For example, a method of preparing alkyl-substituted N-vinyl oxazolidinones is described in U.S. Patent 2,919,279. A method of preparing a copolymer of an alkyl-substituted N-vinyl oxazolidinone and maleic anhydride is described in U.S. application S.N. 19,506, now U.S Patent 3,044,992. Methods of preparing the other copolymers useful in the method of the invention may be found in the texts and treatises on the subject of polymerization, e.g., High Polymers, volumes I to XII, Interscience Publishers Inc., New York, New York.

Two series of tests were run to illustrate the efficacy of different polymers employed in the method of the invention. The monomers, together with an identifying symbol, which were polymerized to prepare the polymers employed in the tests were as follows:

| Monomers: | Symbols subsequently employed herein |
|---|---|
| N-vinyl-2-oxazolidinone | VO |
| N-vinyl-5-methyl-2-oxazolidinone | VMO |
| N-vinyl-5-ethyl-2-oxazolidinone | VEO |
| Vinyl morpholinone | VM |
| Vinyl pyrrolidone | VP |
| Vinyl acetate | VA |
| Maleic anhydride | MA |
| Sodium styrene sulfonate | NaSS |
| Ethylene | E |

SERIES ONE

A synthetic brine was prepared consisting essentially of:

| Ingredient: | Amount Grams |
|---|---|
| Sodium chloride | 280.8 |
| Calcium chloride | 121.2 |
| Magnesium chloride dihydrate ($MgCl_2 \cdot 2H_2O$) | 56.3 |
| Sodium sulfate | 0.9 |

Water, sufficient to make a gallon of brine.

Each of the polymers employed in the first series were prepared by polymerizing substantially 50:50 monomer proportions. The polymers employed as set out in Table I below, were then admixed with the brine in an amount sufficient to make a 15 percent by weight solution of the polymer in the brine. The efficacy of the polymer solution thus prepared to inhibit the adhesion of the hydrocarbonaceous material deposited on a surface in contact with oil was then ascertained by the following test procedure:

Glass slides, 0.31″ x 1″ x 3″, thus providing a surface area of about 8.5 square inches, were prepared by submerging each for a period of one minute in a known glass-cleaning solution consisting by weight, of one part sodium dichromate dihydrate and a solution formed of 16 parts of a 95 percent sulfuric acid and 5 parts of water, rinsing the thus treated slides with distilled water, and thereafter drying for two hours in a 180° F. oven. Each of the slides so cleaned was successively suspended, at room temperature, at the end of a supporting wire, into a graduated cylinder containing 50 milliliters of the aqueous polymer solution identified in the table below so as to be fully submerged in the solution. The slides were retained thus submerged and thereby contacted by the aqueous polymer solution for a period of two hours. Thereafter, 50 milliliters of crude oil, which had previously been heated to 160° F. and supersaturated with paraffin at that temperature, was poured into the cylinder on top of the polymer solution, the temperature of the oil being maintained at 160° F. Each slide, so treated with the polymer solution, was raised until it was above the aqueous solution and completely immersed in the superjacent oil. They were thus brought in contact with the 160° paraffin-supersaturated crude oil, where they were maintained at 16 hours during which the paraffin was allowed to cool to room temperature. At the end of this period, the thus treated glass slides were again lowered into the aqueous polymer solution and allowed to remain submerged therein for one minute. Thereafter they were removed and the percent of the surface area of each slide thus tested which was free of any adhering hydrocarbonaceous material was ascertained.

It is considered that at least about 30 percent of the surface area of the slides should remain substantially oil free in the above test for the aqueous polymer solution to be acceptable in the practice of the invention. The designated polymer and the amounts thereof used, together with the test results expressed in percent of surface area remaining oil-free after re-immersion in the paraffin saturated oil are set out in Table I below.

TABLE I

| Test No. | Polymer admixed with brine | Percent of surface of slide which was free of oil, when using various concentrations of polymer, expressed in parts per million by weight of aqueous solution | | |
|---|---|---|---|---|
| | | 25 p.p.m. | 50 p.p.m. | 100 p.p.m. |
| 1 | VMO homopolymer | 5 | 40 | 90 |
| 2 | Sodium salt of the copolymer of VMO and MA, having a K No. of 37.5 | 5 | 45 | 90 |
| 3 | Sodium salt of the copolymer of VMO and MA, having a K No. of 27.0 | 5 | 65 | 90 |
| 4 | Sodium salt of the copolymer of VMO and MA, having a K No. of 24.5 | 5 | 50 | 85 |
| 5 | Sodium salt of the copolymer of VMO and MA, having a K No. of 14.5 | 5 | 40 | 80 |
| 6 | Copolymer of VMO and NaSS | 20 | (¹) | 55 |
| 7 | Copolymer of VO and MA, having a K No. of 22 | 5 | 0 | 90 |
| 8 | Sodium salt of the copolymer of VEO and MA, having a K No. of 32.5 | 93 | 80 | 98 |
| 9 | Copolymer of VEO and Ma | 90 | 75 | 95 |
| 10 | Copolymer of VM and the half amide of MA | 10 | 35 | 55 |
| 11 | Sodium salt of the copolymer of VP and MA | 65 | 85 | 85 |
| 12 | Copolymer of VP and VA | (¹) | | 80 |
| 13 | Copolymer of E and the ammonium salt of the half amide of MA | (¹) | | 65 |
| 14 | Copolymer of E and maleic | (¹) | | 35 |

¹ Not determined.

Reference to Table I shows that the glass slides were rendered resistant to the adhesion of hydrocarbonaceous material tending to deposit thereon when treated in accordance with the practice of the invention. It may be also observed by reference to the table that 25 parts per million of the polymer, although satisfactory in some instances, e.g., when the copolymer of vinyl morpholinone and maleic anhydride or the sodium salt of N-vinyl-5-ethyl-2-oxazolidinone and maleic anhydride are employed, are not sufficient. Generally for attainment of satisfactory results. However, when 50 parts per million are employed, and particularly when 100 parts per million are employed, at least 35 percent, and as high as 98 percent of the area of the thus treated slides remain deposition-free when re-submerged in the paraffin containing oil.

The second series of tests was conducted by employing the aqueous polymer solutions set out in Table II in an amount of 0.025 percent by weight together with 5 percent by weight of either NaOH or $Na_3PO_4$. The test apparatus and procedure employed, however differed, and were as follows:

(1) A hollow steel cylinder, 1 inch in diameter and 6 inches long, closed at one end and open at the other end, was marked circumferentially a distance of about 3 inches from the closed end (ultimately to be the lower end) to set off a specific exterior surface. The cylinder was provided with a 3-hole stopper in the open end. One of such holes contained a thermometer, a second an inlet tube, and the third an outlet tube. The inlet tube was adapted to be connected to an exterior constant-temperature water reservoir and a pumping arrangement in series for providing water to the cylinder. The outlet tube was adapted to be connected to the same water reservoir for the purpose of returning water from the cylinder to the reservoir for heating.

(2) A 3-liter flask, provided with three openings in the top thereof, one opening in the center and two outer openings spaced radially therefrom, was placed in a constant temperature bath. Into one of the outer openings was inserted a 2-hole stopper provided with an inlet tube and a stirrer connected to a source of power for rotating the stirrer. Into the other of the outer openings was inserted a second 2-hole stopper but provided with a thermometer and an outlet tube. The outlet tube led to a pumping arrangement connected to said inlet tube which provided a means of externally circulating fluid contained in the flask. The center hole was adapted to receive the hollow steel cylinder, above described.

The test was conducted as follows:

The hollow steel cylinder was polished with emery cloth, washed with acetone, and air-dried. It was then treated by immersing it in an aqueous alkaline polymer composition prepared for use according to the invention. The cylinder was immersed, with the closed end downward, so that the exterior of the hollow cylinder was contacted thereby up to the circumferential mark by the composition. It was immersed therein at room temperature, raised to 175° F. for a period of 15 minutes and allowed to return to room temperature during a period of 45 minutes.

Three percent by weight of a crude wax derived from petroleum was admixed with crude oil and the resulting mixture heated to between 150° and 160° F. until the wax was dissolved. 2500 milliliters of the oil having the wax thus added thereto was then placed in the 3-liter flask and the stirrer and the circulating means, as described above, put into operation.

The steel cylinder, as above treated in accordance with the invention, was then inserted in the center hole of the 3-liter flask, so that the closed end of the cylinder was in the flask and the stoppered end, as above described, extended outside of the flask. The cylinder was inserted to such depth in the oil in the flask that the circumferential mark on the cylinder was at the oil level. Water, controlled at 90° F., was then circulated through the cylinder by means of the inlet and outlet tubes leading to and from the constant temperature reservoir, described above. The temperature of the interior of the steel cylinder was thereby maintained at 90° F. The oil containing the wax dissolved therein, thus placed in contact with the outer surface of the steel cylinder, was maintained at 120° F. by means of the constant temperature bath. The cooler steel cylinder, thus immersed in the warmer wax-contained oil, was maintained therein for a period of 2 hours.

The steel cylinder was then removed therefrom, detached from the water circulating lines, and immersed in a beaker containing 800 milliliters of water at 80° F. The cylinder was gently handled and no agitation in the water into which it was thus immersed was permitted thereby preventing disturbance of the deposit. The test sample was maintained in the 80° F. water for about 5 minutes. Adhering oil and a portion of the adhering hydrocarbonaceous or "paraffin" material gradually left the surface of the cylinder. The cylinder was then removed and the percent oil-contacted surface of the cylinder, which became oil-free in the 80° F. water, was calculated. The results are set out in the table below.

TABLE II

| Test No. | Polymer admixed with water | Percent of surface area free of oil |
|---|---|---|
| 15 | Copolymer of VMO and MA under 5 percent NaOH. | 98 |
| 16 | Copolymer of VMO and MA with 5 percent Na₃PO₄. | 95 |
| 17 | Copolymer of VO and MA with 5 percent NaOH. | 30 |
| 18 | Copolymer of VP and MA with 5 percent NaOH. | 35 |
| 19 | Homopolymer of VO with 5 percent NaOH. | 45 |

Reference to Table II wherein the results of the test procedure employing the cold metal cylinder are set out shows that the aqueous polymer solution of the invention is effective to inhibit deposition of hydrocarbonaceous material when used in an amount of about 250 parts per million of aqueous medium. It also shows that the invention may be practiced in the presence of NaOH or Na₃PO₄.

The following example was carried out in the field to illustrate the practice of the invention:

*Example*

A producing well in the Dricky Queen Pool, near Hobbs, New Mexico, was giving extensive trouble, due to the accumulation of paraffin deposits on the inner surface of the tubing. The situation was of such gravity that the paraffin deposits were required to be removed at least once a month. Immediately following removal of paraffin according to conventional practice, the production of the well was about 10 barrels of oil and one barrel of water per day. However, following such treatment, the production decreased until after a period of 30 days, it was only about one barrel of oil and 0.25 barrel of water per day.

The well was treated in accordance with the invention as follows:

Hot oil was employed to remove the paraffin already deposited on the inner walls of the tubing. Thereafter, the hot oil in the tube was displaced by injecting into the tubing 4165 pounds of a solution composed of: (1) 11.7 pounds of the sodium salt of the copolymer of N-vinyl-5-methyl-2-oxazolidinone and maleic anhydride of a monomer proportion of about 1:1 and having a K value of about 27.5 dissolved in 35.1 pounds of water about a 25 percent by weight aqueous solution and (2) 3702 pounds of additional water containing 416 pounds of NaOH, at a temperature of 175° F. The composition thus injected was allowed to soak in contact with the interior tubing for one hour. Thereafter the thus used solution was removed and the well was returned to production.

Following its return to production, a follow-up treatment was carried out which consisted of pumping down the annular space between the tubing and casing and lubricating, i.e., beading, into the tubing at a point near the bottom thereof daily a composition which consisted of 2.3 pounds of the above described copolymer per 7 pounds of water, about one gallon of a 25 percent by weight aqueous solution. The polymer solution was thus carried back up the tubing with the oil being produced. This follow-up treatment was continued for a period of two months. At the end of that period, the production from the well was still 10 barrels of oil and 1 barrel of water per day. In other words, the production records showed that there was no decrease in production during the ensuing two-month production period showing the efficacy of the treatment of the interior surface of the tubing with the aqueous polymer solution in accordance with the practice of the invention.

The test results and example show that the method of the invention, employing any one of the designated polymers, is effective in lessening the adhesion of solid hydrocarbonaceous substances on the surfaces of containers in contact with oil containing such material.

Having described our invention, what is claimed and desired to be protected by Letters Patent is:

1. The method of inhibiting the adhesion of solid hydrocarbonaceous material, deposited on surfaces from oil containing such substances in solution or suspension in contact therewith, which consists essentially of flushing said surfaces with an aqueous dispersion of an agent which yields OH ions in an aqueous medium and subjecting the thus flushed surfaces to the action of an aqueous solution containing between 5 and 1000 parts, per million parts aqueous solution, of a polymer having a molecular weight of at least about 10,000 selected from the class consisting of homopolymers of N-vinyl-alkyl-2-oxazolidinone; copolymers of N-vinyl-alkyl-2-oxazolidinones and a monomer selected from the class consisting of maleic anhydride, sodium styrene sulfonate, sodium vinyl toluene sulfonate, and alkyl acrylic acids; alkali salts of copolymers of N-vinyl-2-oxazolidinones and maleic anhydride; copolymers of vinylmorpholinone and maleic anhydride and alkali salts thereof; copolymers of vinylpyrrolidone and a monomer selected from the class consisting of maleic anhydride and vinyl acetate; copolymers of ethylene and maleic anhydride; copolymers of ethylene and maleic acid; and alkali amide salts of copolymers of ethylene and maleic anhydride, each of said alkyl substituent being selected from methyl and ethyl and said alkali salts being selected from the class consisting of alkali metal and ammonium salts.

2. The method according to claim 1 wherein the N-vinyl-alkyl-2-oxazolidinone is N-vinyl-4-alkyl-2-oxazolidinone.

3. The method according to claim 1 wherein the N-vinyl-alkyl-2-oxazolidinone is N-vinyl-5-alkyl-2-oxazolidinone.

4. The method according to claim 1 wherein said polymer is the copolymer of an N-vinyl-alkyl-2-oxazolidinone and maleic anhydride.

5. The method according to claim 1 wherein said polymer is the sodium salt of the copolymer of an N-vinyl-2-oxazolidinone and maleic anhydride.

6. The method according to claim 1 wherein said aqueous polymer solution contains at least about 1.0 percent of a substance yielding OH ions in aqueous media.

7. The method according to claim 1 wherein said aqueous dispersion consists of such polymer in a concentration by weight of between 25 and 100 parts thereof per million parts of said aqueous dispersion.

8. The method according to claim 1 wherein the inhibition of adhesion of hydrocarbonaceous material is enhanced by a follow-up treatment which consists of periodically admixing with the oil, subsequent to subjecting the surface to the action of the aqueous solution of a polymer as defined in claim 1, an additional aqueous solution of a polymer as defined in claim 1, in an amount of at least 0.5 gallon of at least a 25 parts polymer per million parts of solution by weight per 100 barrels of oil.

9. The method according to claim 8 wherein said follow-up treatment consists of admixing between 0.2 and 20.0 gallons of an aqueous polymer solution consisting of between 25 and 1000 parts of said polymer per million by weight of the aqueous solution periodically at between about 12 and about 72 hour intervals.

(References on following page)

References Cited by the Examiner

UNITED STATES PATENTS

| | | | |
|---|---|---|---|
| 1,892,205 | 12/1932 | De Groote | 252—8.3 |
| 2,612,485 | 9/1952 | Baer et al. | 252—8.5 |
| 2,669,557 | 2/1954 | Wheaton | 252—8.5 |
| 2,857,365 | 10/1958 | Johnson | 252—8.5 |
| 2,981,684 | 4/1961 | Barnes et al. | 252—8.3 |
| 3,025,234 | 3/1962 | Canterino | 252—8.5 |
| 3,067,134 | 12/1962 | Parks et al. | 252—8.3 |
| 3,096,777 | 7/1963 | Parks et al. | 252—8.3 |
| 3,108,956 | 10/1963 | Dever et al. | 252—8.5 |

JULIUS GREENWALD, *Primary Examiner.*

ALBERT T. MEYERS, *Examiner.*